United States Patent [19]

Pogoda et al.

[11] 4,267,147
[45] May 12, 1981

[54] METHOD FOR PRODUCING FIBER REINFORCED STRUCTURE COMPONENTS

[75] Inventors: Dieter Pogoda, Hamburg; Claus Petters, Brekendorf; Arno Rost, Diemelsee, all of Fed. Rep. of Germany

[73] Assignee: Messerschmit-Boelkow-Blohm GmbH, Munich, Fed. Rep. of Germany

[21] Appl. No.: 72,890

[22] Filed: Sep. 6, 1979

Related U.S. Application Data

[63] Continuation-in-part of Ser. No. 846,816, Oct. 31, 1977, abandoned.

[30] Foreign Application Priority Data

Jun. 11, 1976 [DE] Fed. Rep. of Germany ....... 2650859

[51] Int. Cl.$^3$ ................................................ B29C 3/00
[52] U.S. Cl. .................................. 264/571; 264/113; 264/120; 264/DIG. 78
[58] Field of Search ............... 264/112, 113, 571, 120, 264/DIG. 78

[56] References Cited

U.S. PATENT DOCUMENTS

| | | | |
|---|---|---|---|
| 3,004,295 | 10/1961 | Bottoms | 264/510 |
| 3,666,600 | 5/1972 | Yoshino | 474/112 |
| 3,770,546 | 11/1973 | Childress et al. | 156/245 |
| 4,065,340 | 12/1977 | Dickerson | 156/154 |

Primary Examiner—Donald E. Czaja
Assistant Examiner—James R. Hall
Attorney, Agent, or Firm—W. G. Fasse; D. F. Gould

[57] ABSTRACT

In a method for producing large structural components such as boats or swimming pools of fiber reinforced synthetic materials layers of pre-impregnated fiber material are continuously applied to a mold. An air impermeable foil or membrane is sealed over the layers of pre-impregnated fiber material. The air is evacuated between the foil or membrane and the fiber material to press the latter by atmospheric pressure against the mold to cause the material to conform to the shear surfaces of the mold. The layers of pre-impregnated fiber materials are then heat cured by heated mats, for example, similar to electric blankets. The sheer surfaces of the molding apparatus are made of sheet material such as sheet metal or sheets of synthetic material. The pressure application and heat curing takes place sequentially in area after area whereby the final size of the finished structure is not limited by the size of an autoclave nor is it limited by the size of available heating blankets.

7 Claims, 8 Drawing Figures

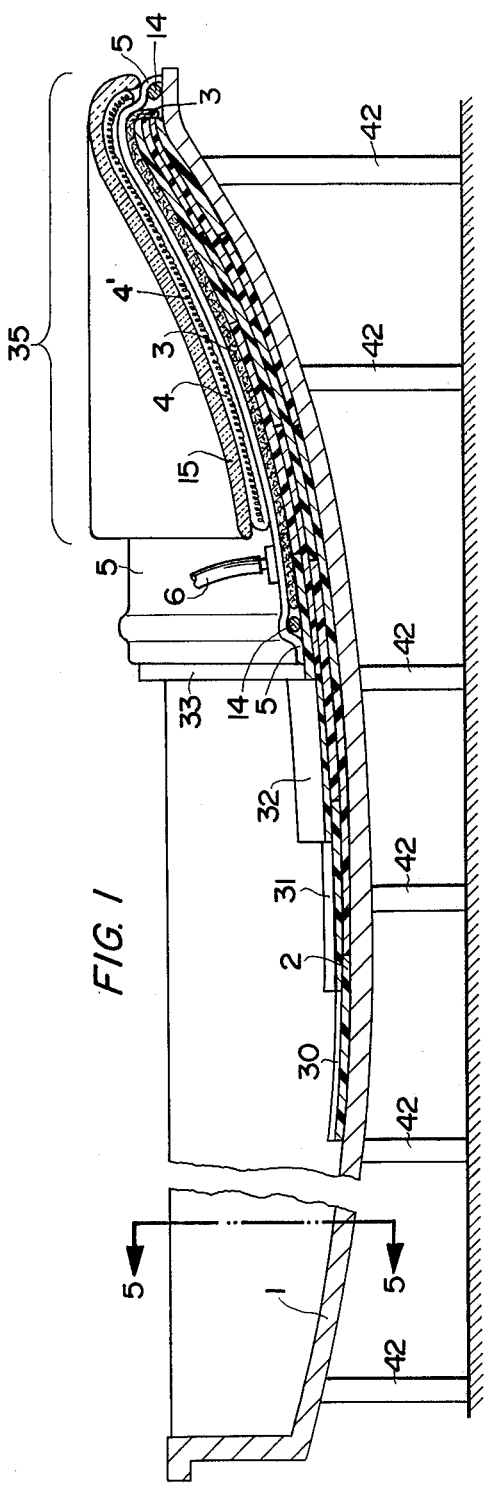
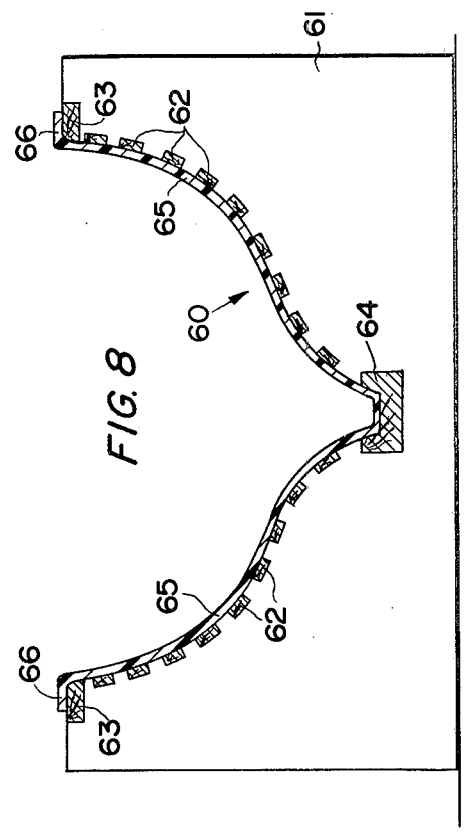

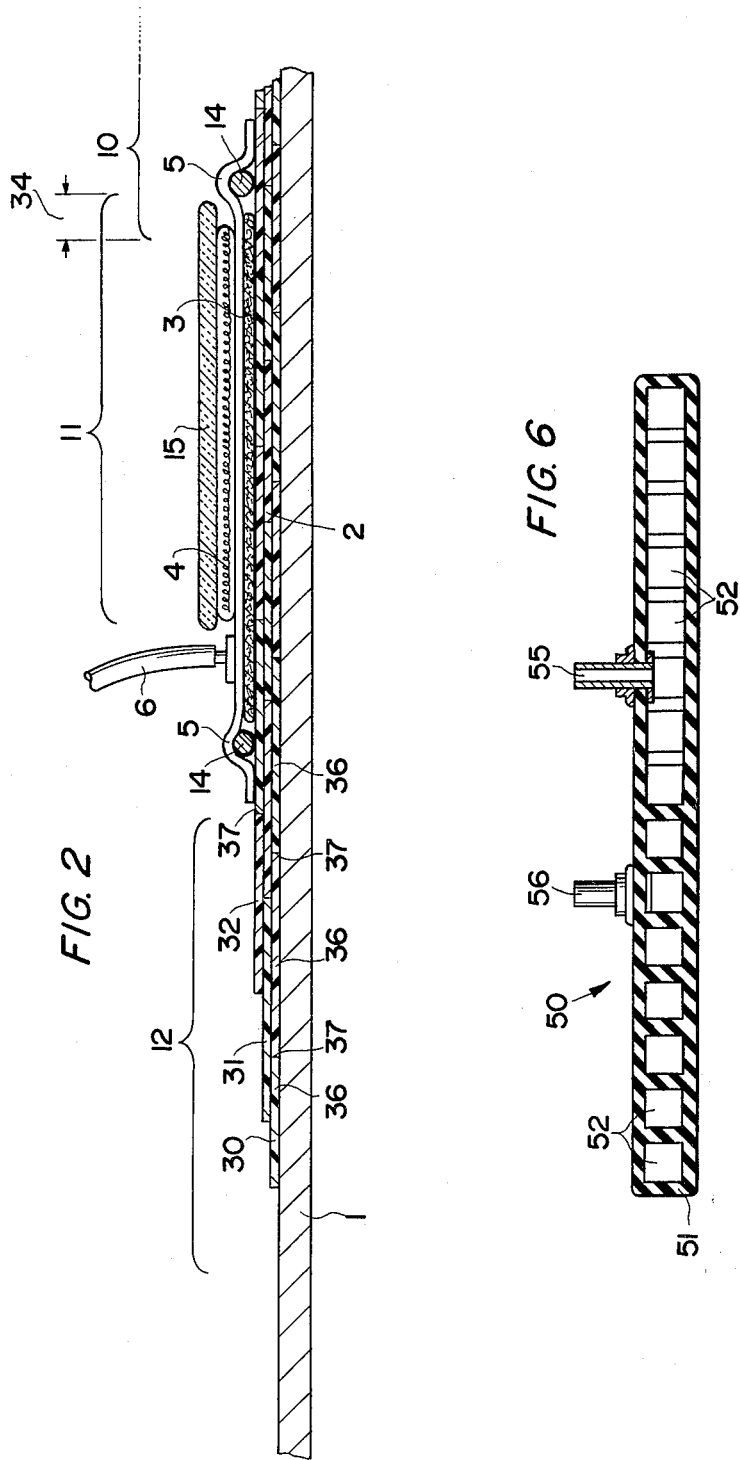

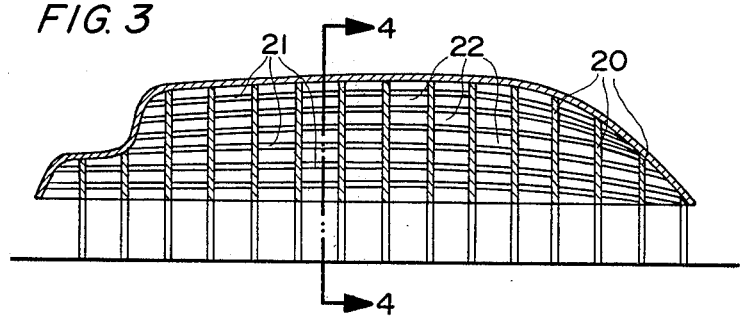
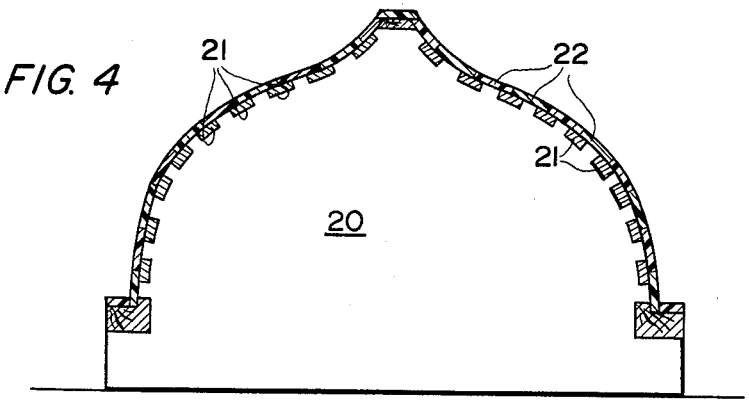

METHOD FOR PRODUCING FIBER REINFORCED STRUCTURE COMPONENTS

CROSS-REFERENCE TO RELATED APPLICATIONS

The present application is a continuation-in-part application of our copending application Ser. No. 846,816 filed on Oct. 31, 1977 now abandoned.

BACKGROUND OF THE INVENTION

The invention relates to a method of making large structural components, preferably such as are used for manufacturing aircraft and vessels. Such components are made of fiber reinforced synthetic materials.

In a known method for producing structural components of the above mentioned type, fiber mats and/or fiber webbings and/or rovings are employed which are impregnated in or on a mold by means of liquid synthetic materials such as epoxy resins or unsaturated polyester resins. It is customary to employ positive as well as negative molds. The curing of the synthetic material takes place at room temperature or by the application of heat, whereby the individual layers may be pressed against each other, for example, by pneumatic means. The time which is available for applying the individual layers is determined by the so-called "pot time" of the liquid synthetic materials. This time is determined by the workability of the material before it hardens. If it is not possible to apply all layers during the "pot time" of a particular batch, the application of layers is continued after a new batch of synthetic resins is mixed. This prior art method is referred to as "batch method" and is very time consuming and hence it increases labor costs. The synthetic resin mixtures must be mixed by hand and therefore mixing errors are possible. It is not possible to maintain constant the ratio between fibers and synthetic materials due to the manual layer application and the manual impregnation. The laminar shearing strength among the several layers is small. Inaccurate mixing and application lead to loss in structural strength. Such loss in strength may be compensated by larger dimensions. However, larger dimensions increase both the structural weight and the costs. Where heat curing is employed, the size of the structural component is limited by the dimensions of the autoclave. Besides, when manually handling the liquid synthetic resin impregnating materials, the volatile components of such impregnating materials are liberated which are health hazards and harmful to the environment.

An advantage of the prior art batch method is seen in that very large structural components may be made where cold curing or hardening is used.

According to another known method, fiber webbings and/or mats and/or rovings are used which are pre-impregnated in the factory. The synthetic mass forming part of these materials is already mixed. The curing takes place by the application of heat. The main advantages of this method using pre-impregnated materials are lower labor costs than in the first mentioned batch method, because the impregnating is obviated. The processing of such pre-impregnated material is thus neither a health hazard nor does it adversely affect the environment. The mixing of the synthetic material in the factory reduces mixing errors and the ratio of fibers to synthetic material is constant within narrower limits. The laminar shearing strength among the layers is high. The high constancy of the mixing ratio results in uniform material strength values which permit lower safety factors and thus lower structural weights.

However, these advantages of the prior art method using pre-impregnated materials must be weighed relative to the disadvantages, such as the heat required for curing and the limitations on the size of the structural components imposed by the dimensions of an autoclave necessary for the curing. Please see U.S. Pat. Nos. 3,666,600; granted on May 30, 1972, and 3,004,295; granted on Oct. 17, 1961.

The positive or negative molds which are employed in the two just described prior art methods, are manufactured by first making wooden mold frames and by making the sheer surfaces of steel or aluminum sheet material. For this purpose it is necessary that the respective sheet metal parts have the correct curvature or spherical shape prior to their being fitted into the mold. Thus, the costs for making the molds are very high.

OBJECTS OF THE INVENTION

In view of the foregoing, it is the aim of the invention to achieve the following objects, singly or in combination:

to provide a method by means of which it is possible to manufacture large structural components from fiber reinforced synthetic materials while using pre-impregnated fiber materials and while employing a heat curing without an autoclave;

to provide a method in which the individual layers of synthetic material may be pressed against a mold and against each other by atmospheric pressure sequentially in area after area without a press;

to provide a method which may be practiced by using molds that may be manufactured inexpensively; and to sequentially cure the entire structure in area after area so that the curing is independent of any autoclave and even substantially independent of the size of the heating means.

SUMMARY OF THE INVENTION

According to the invention there is provided a method for the manufacture of large structural components comprising the following steps: continuously applying a pre-impregnated fiber material in a plurality of layers to a mold structure, pressing the layers against the mold structure by atmospheric pressure through the intermediary of relatively thin flexible material such as membranes or foils and curing the layers of synthetic material by means of heated mats. In this context the term "foil" shall include thin sheets of synthetic material such as polyethylene foils impermeable to air.

According to the invention there is further provided a structural component manufactured according to the steps of the present invention. The sheer surfaces of the molds used herein are made of plates or sheets of synthetic material.

BRIEF FIGURE DESCRIPTION

In order that the invention may be clearly understood, it will now be described, by way of example, with reference to the accompanying drawings, wherein:

FIG. 1 is a sectional view through a positive mold, for example of a boat hull, to which mats of fiber material have been partially applied to the desired thickness in a first surface area portion which is being heat cured while other areas are still being laminated;

FIG. 2 is a sectional view of a portion of a mold having, for simplifying the illustration, a flat bottom and showing three zones or surface areas in different states of completion;

FIG. 3 is a longitudinal section through an example embodiment of a positive mold which may be used for performing the method according to the invention;

FIG. 4 is a section through the positive mold of FIG. 3 along section line 4—4 with planks formed of synthetic sheet material applied to the mold;

FIG. 6 is a sectional view along section line 6—6 in FIG. 7, through a fluid heating pad that may be used for the curing step of the present method;

FIG. 8 is a sectional view through a mold similar to that of FIG. 5, however, with planking forming a unitary trough.

Figure 5:
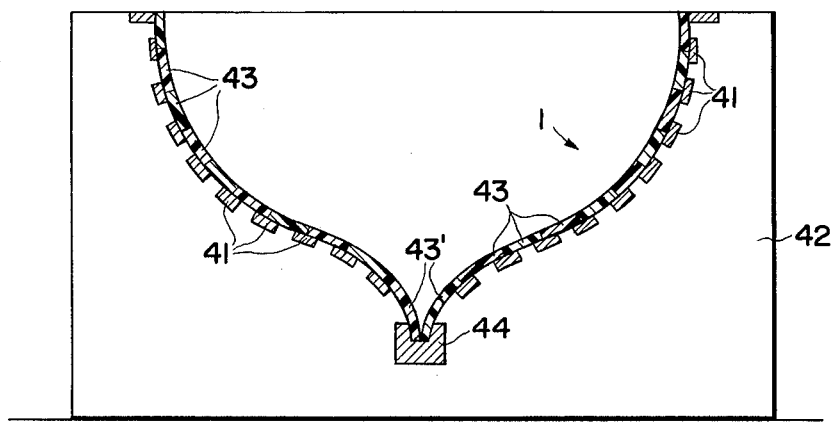
FIG. 5 is a section through a negative mold along section line 5—5 in FIG. 1 wherein the planking comprises sheets or strips of synthetic material applied to the mold.

DETAILED DESCRIPTION OF PREFERRED EXAMPLE EMBODIMENTS AND OF THE BEST MODE OF THE PRESENT INVENTION

FIG. 1 shows an example embodiment of a mold 1 used in practicing the present invention for making a boat hull having approximately a length of 30 meters. The pre-impregnated fiber mats 2 are applied in several, for example four, overlapping layers 30, 31, 32, 33, onto the mold 1. The mold 1 is of conventional construction. Prior to using the pre-impregnated fiber mats 2 they are stored at low temperatures of about $-18°$ C. because the synthetic material mass held in the mats has a tendency to enter into a binder reaction even at room temperature. However, such reaction is limited. Thus, the invention provides that the fiber mats 2 which have been laminated in a given area to the required thickness are being cured while laminating continues in areas contiguous or adjacent to said given area.

In FIG. 1 a first surface area or zone 35 in which the fiber mat layers 30, 31, 32, 33 have already reached the desired thickness, is covered by a fleece 3, by a vacuum foil 5 and by a heatable mat 4. The fleece 3 is a separator layer as, for example disclosed in the above mentioned U.S. Pat. No. 3,666,600. The vacuum foil 5 may be of the type also disclosed in the just mentioned U.S. Pat.

As mentioned, the term vacuum "foil" is meant to cover all substantially air impermeable membranes such as plastic sheets. The purpose of the fleece 3 is to prevent any bonding of the heating mat 4 to the resin of the fiber material. For said curing of said first surface area 35 covered by the layers 30, 31, 32, 33 to the desired thickness, the entire space between the vacuum foil 5 and the mold 1 is first sealed by the seals 14 and then evacuated by a vacuum pump not shown but connected to the exhaust port 6. Thus, the foil 5 is rigidly pressed against the pre-impregnated fiber material 2 by the atmospheric pressure. Thereafter the heating mat 4, such as an electric heating pad or blanket is applied as shown and heated up, whereby the heating duration and the temperature is determined by the material used. An insulating pad 15, of foam rubber for example, may be placed over the heating pad 4 to conserve heat.

Due to the heating, the synthetic material mat formed by the layers 30, 31, 32, 33 becomes initially plastic in the first area or zone 35 so that the layers 2 conform smoothly to the shape of the mold 1. After completion of the curing reaction, the vacuum foil 5, the heating mat 4, as well as the fleece 3, and the insulation 15 are removed and placed on the next adjacent area, the lamination of which has meanwhile been completed to the desired thickness. The pad 4 is then heated again in order to cure the next adjacent area in which the desired thickness has meanwhile been reached. This procedure may be performed employing several heating pads 4 simultaneously. Care must be taken, however, that at the boundaries between areas cured at different times, there do not remain uncured spots. In order to avoid such spots the boundary areas may be heated twice by providing a small overlap zone 34 as shown in FIG. 2 between the completed zone 10 and the zone 11 presently being cured. The quality of the finished product is practically not affected at all by such overlap zone 34.

FIG. 2 illustrates schematically the laminated layer construction in which the first area 10 has already been cured, whereas the area 11 is being cured and the area 12 is being laminated while the area 11 is being cured. Seals 14 are inserted between the edges of the foil 5 and the layers to be cured to preserve the vacuum under the foil 5. For clarity, the thickness of the pre-impregnated fiber material is enlarged to an extent out of proportion to the remainder of the illustration. In the manner just described, the entire wall of the boat hull is continuously laminated and cured in a stepwise manner. All known types of construction may be accomplished by using the method according to the invention without regard to the size of the structure and without the need for a curing autoclave or oven. Only three layers 30, 31, 32 are shown in FIG. 2. These layers are made up of individual strips 36 separated by butt seams 37 which are covered by the overlaps of the next layer 31 and so forth.

According to the invention it is, for example, possible to integrate frame members and stringers into the structural component by inserting respective form members made of hard foam material. It is also possible to employ the method according to the invention where sandwich type walls are produced using foam material or where honeycomb cores are to be produced.

FIGS. 3 and 4 illustrate an example embodiment using a positive mold for a boat hull comprising spar or frame elements 20 as well as longitudinal ribs 21 and planking 22. The spar elements 20 and the longitudinal ribs 21 are made, for example, of structural lumber suitable for such vessels. The wood skeleton for the mold is constructed conventionally by securing, for example, by nailing or gluing plates or sheets of synthetic material forming the planking 22, to the longitudinal ribs 21. The secured planking 22 or strips 22 may, for instance, be made of acrylbutadienestyrene $C_6H_5CH$ (ABS), polycarbonate (PC) or similar materials. Planking of such materials may easily be bent into the desired shape when the planking is secured to the ribs 21, whereby even a somewhat spherical forming or shaping is possible. On the other hand, these materials have the necessary dimensional rigidity even at the curing temperature of the liquid synthetic material. In the same manner it is possible to construct the negative molds as shown in FIG. 5. Molds of the described type have the advantage that they can be constructed at substantially less expense than molds of steel or light metal. In both instances the layers 30, 31, 32, 33 are applied to the planking 22 as described above with reference to FIGS. 1 and 2.

FIG. 4 illustrates a section through the positive mold of FIG. 3. This figure shows how the sheer surface of the mold is formed by the shaped synthetic material sheets or plates 22. The longitudinal ribs 21 are first secured to the spar elements 20. Thereafter the planking 22 is secured to the longitudinal ribs 21, for example, by nailing. The shaping of the sheets of synthetic material forming the planking takes place substantially when the planking 22 is secured to the longitudinal ribs 21, whereby the deformation remains substantially within the elastic range. In spots where the deformation of the planking 22 is substantial, it is possible to preheat the sheets 22, for example, by a conventional infrared radiator not shown, whereby the sheets or plates may be deformed in a plastic manner.

It is possible, incidentally, to heat the mats 4 by means other than the shown electrical heating wires 4'. For example, the mats could be heated by steam and/or by heated oil flowing through hollow mats shown in FIGS. 6 and 7. In any event the curing temperatures will be in the range of 90° C. to 130° C., depending on the materials used. The curing time will be from about 60 minutes to about 120 minutes.

FIG. 5 is a sectional view similar to that of FIG. 4, however, showing a negative mold. The section extends along line 5—5 in FIG. 1. Ribs 41 extending longitudinally of the boat hull are secured to frame members 42 and planking elements 43 are in turn secured to the ribs 41 as has been described above with reference to FIGS. 3 and 4. A keel member 44 is held in the frame elements 42 and in turn holds the keel formed by planking elements 43'. The molding operation takes place as described above with reference to FIGS. 1 and 2. In other words, the layers 30, 31, 32, and so forth are applied to the planking 43, 43' and cured sequentially surface area after surface area as described.

Figure 7:
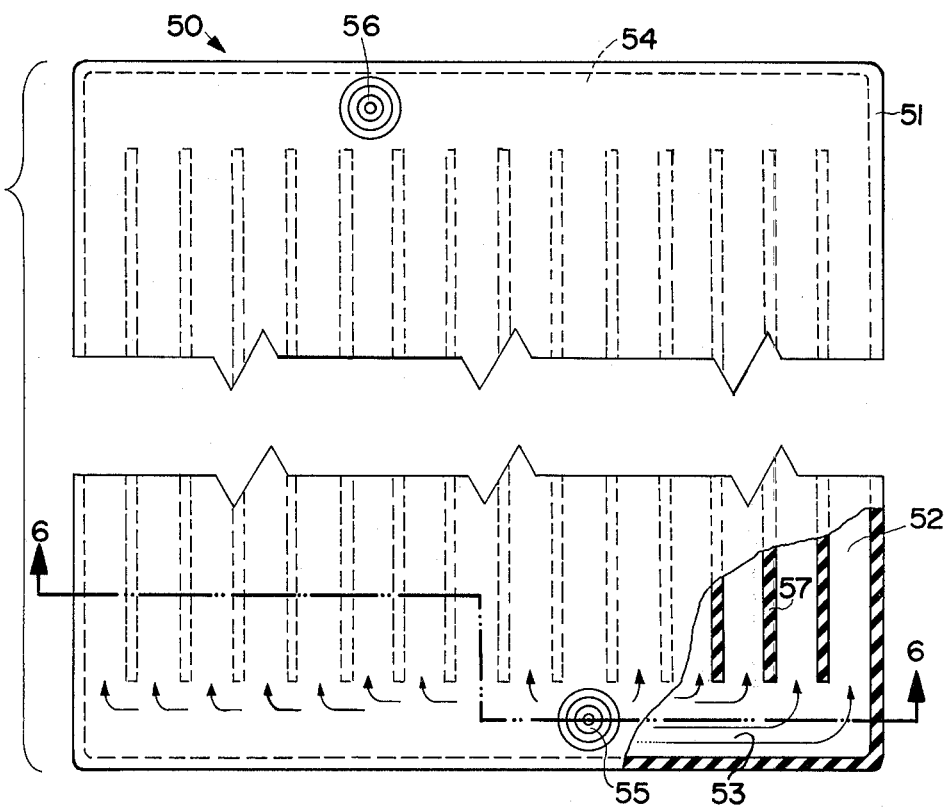
FIG. 7 is a top plan view of the heating pad of FIG. 6.

Instead of using an electrical heating blanket 4 as shown in FIGS. 1 and 2, it is also possible to use a hot water bottle type of heating device 50 as shown in section in FIG. 6 and in the top plan view in FIG. 7. The heating device 50 comprises a flat rubber elastic body envelope 51 including a plurality of channels 52, a distribution channel 53, and a collection channel 54, as well as an inlet port 55 and an outlet port 56.

A heated medium such as a hot gas or a hot liquid such as heated oil will pass into the inlet port 55 and through the distributing channel 53 and to all of the channels 52. At the other end of the heating device 50 the collecting channel 54 operatively connects all channels 52 to the outlet ports 56. Due to the elasticity of the envelope 51 the heating device 50 will be able to accommodate its shape to the intended shape of the large structural component. Even the ribs 57 which facilitate an even distribution of the heating medium over the entire surface area of the heating device 50, are sufficiently flexible to permit the conforming of the heating device 50 to the shape of the structural component.

Heated steam and/or oil may be used in the device illustrated in FIGS. 6 and 7. Thus, the curing temperatures in the range of about 90°0 C. to 130° C., depending on the materials used, may easily be controlled. The curing time will normally be from about 60 minutes to about 120 minutes.

FIG. 8 illustrates a sectional view similar to that of FIG. 5 and also showing a negative mold 60 made up of spar members 61 and longitudinal ribs 62. Upper edge reinforcing ribs 63 extend around the entire mold and a keel member 64 extends along the bottom of the mold 60. The ribs 62 and the edge reinforcing ribs 63 as well as the keel member 64 are all secured to the spars 61 by conventional means. According to the invention the mold is lined with an envelope 65 of synthetic material such as acryl-butadien-styrol (ABS), polycarbonate (PC) or the like. This envelope 65 provides a protective coating against mechanical damages to the body applied to the envelope 65 in the manner described above. The envelope 65 is merely secured at its edges 66 to the ribs 63, for example, by nailing. Upon completion of the entire structure the nailing along the edges 66 is removed and the envelope 65 forms an integral, intimately bonded component of the entire large scale structure made according to the above steps, for example, of a plurality of epoxy resin reinforced fiber webbings or mats not shown in FIG. 8. The envelope 65 is made of sheets of the above material such as polycarbonate and these sheets are welded to each other in conventional ways to form a substantially watertight single piece trough which rests on the ribs 62, 63 substantially without any internal stress. There are no open seams between the sheets forming the trough or envelope 65. Thus, the above mentioned securing of the envelope 65 at the upper edges 66 is sufficient. Since there is no separation layer between the envelope 65 and the pre-impregnated mats, the latter are intimately bonded to the envelope. Upon removal of the trough 65 from the mold it will become a permanent part of the large scale structural component such as a boat hull thus forming a protective outer envelope for such boat hull. In addition, depending on the type of material used for making the protective envelope 65, the latter will also be able to provide an effective barrier against the penetration of water into the hull body made of, for example, epoxy resin reinforced fiber mats as disclosed herein.

It is well known, that epoxy reinforced resin systems exhibit substantially larger mechanical strengths than unsaturated polyester resins. Heretofore it was not possible to take advantage of the superior strength of epoxy resin reinforced structures for large scale components due to the requirement of heat curing in an autoclave which cannot be constructed on a large scale unless they become prohibitively expensive and hence economically unfeasible.

Incidentally, the pre-impregnated fiber mats are well known in the art as disclosed by the above mentioned United States Patent. Normally, the resins have the required viscosity or such viscosity may be adjusted by means of a solvent or by varying the temperature. These pre-impregnated mats are also conventionally provided with a separation layer or foil and they are commercially available in rolls which, however, require storage at a temperature of about −18° C. At that temperature such pre-impregnated mats may be stored for about six months. Once the pre-impregnated mats are removed from cold storage, they must be used within about 5 days.

Incidentally, instead of using a separation layer as mentioned above, the planking 22 in FIG. 4 or 44 in FIG. 5 could be first coated with a separation means such as silicone oil or the like, thereby obviating the separation layer.

The present invention makes it possible for the first time to take advantage of the superior strength of epoxy resin reinforced fiber components in structures such as entire swimming pools which heretofore have been cured at room temperature or smaller segments have been glued together at the construction site because autoclaves of this size would make the pools prohibitively expensive. Another advantage of the invention is seen in that even smaller components which heretofore were cured in a respective autoclave can be made by the method according to the invention without an autoclave.

Incidentally, the vacuum foil 5 in FIGS. 1 and 2 has intentionally not been hatched to make it stand out more from the various layers shown in section in these figures.

Although the invention has been described with reference to specific example embodiments, it will be appreciated, that it is intended to cover all modifications and equivalents within the scope of the appended claims.

What is claimed is:

1. A method for producing a large structural component of fiber reinforced mats which are pre-impregnated by thermosetting synthetic material and which are applied to a conventional mold, comprising the steps of:
   (a) applying strips of said fiber reinforced mats to a first surface area of a mold to build-up a given thickness of several layers in said first surface area and repeating said applying on further surface areas,
   (b) applying pressure to said mats on said first surface area where the mats have reached said given layer thickness, for pressing said mats to the mold by covering said first surface area with a flexible means, providing a vacuum seal between said flexible means and said first surface area around the edges of said first surface area and evacuating the space between said flexible means and said first surface area,
   (c) heating, outside an autoclave, said first surface area where the mats have reached said given layer thickness for curing said mats in said first surface area, and
   (d) sequentially repeating said applying of pressure and heat for said curing on said further surface areas where said given layer thickness has meanwhile been reached, whereby the structural component is formed in a continuously advancing yet stepwise manner, so that said structural component may be cured by said thermosetting without regard to the size of available autoclaves, prior to its removal from the mold.

2. The method of claim 1, wherein step (c) is accomplished by electrically heated mat means.

3. The method of claim 1, wherein step (c) is accomplished by flowing a heated fluid through the mat means.

4. The method of claim 1, wherein said strips are laid down in overlapping relationship so that the strips in one layer cover the seams between strips of an adjacent layer.

5. The method of claim 1, wherein prior to step (a) lining said mold surface with an envelope of synthetic material and bonding said envelope of synthetic material to the pre-impregnated mats during and by said curing, said envelope providing a protective coating for said structural component.

6. The method of claim 1, wherein said thermosetting synthetic material is an epoxy-resin.

7. A structural component made of fiber reinforced mats when made by the steps of claim 1 or claim 7.

* * * * *

UNITED STATES PATENT OFFICE
CERTIFICATE OF CORRECTION

Patent No. 4,267,147     Dated May 12, 1981

Inventor(s) Dieter Pogoda et al

It is certified that error appears in the above-identified patent and that said Letters Patent are hereby corrected as shown below:

in [30] Foreign Application Priority Data, the date should read: November 6, 1976 [DE].

in claim 7, line 2, the back reference should read:

"claim 1 or claim 5".

Signed and Sealed this

Sixteenth Day of March 1982

[SEAL]

Attest:

Attesting Officer

GERALD J. MOSSINGHOFF

Commissioner of Patents and Trademarks